United States Patent [19]
Engh, III et al.

[11] Patent Number: 5,407,624
[45] Date of Patent: Apr. 18, 1995

[54] METHOD AND APPARATUS FOR PROCESSING OF RAW PLASTICS FOR REUSE

[75] Inventors: Harold V. Engh, III, Geneva; Verlyn Swagger, St. Charles, both of Ill.

[73] Assignee: North American Plastics Corporation, Aurora, Ill.

[21] Appl. No.: 73,551

[22] Filed: Jun. 9, 1993

[51] Int. Cl.⁶ .......................... B29B 9/10; B29C 47/10
[52] U.S. Cl. ..................... 264/141; 209/214; 241/60; 264/118; 264/323; 264/DIG. 69; 264/169; 425/202; 425/308; 425/315
[58] Field of Search ............. 264/37, 323, DIG. 69, 264/140-143, 118, 169; 425/308, 202, 315; 241/60; 209/636, 214

[56] References Cited

U.S. PATENT DOCUMENTS

| | | |
|---|---|---|
| 3,399,426 | 9/1968 | Weasel, Jr. ............... 264/DIG. 69 |
| 3,843,060 | 10/1974 | Colburn ........................... 264/37 |
| 4,067,826 | 1/1978 | Emery ............................. 264/37 |
| 4,162,880 | 7/1979 | Cobbs, Jr. et al. ............. 425/202 |
| 4,225,640 | 9/1980 | Erb ................................ 264/122 |
| 4,413,969 | 11/1983 | McDonald ....................... 264/37 |
| 4,738,808 | 4/1988 | Hammer et al. ............... 264/323 |
| 4,874,095 | 10/1989 | Warych ........................ 264/177.1 |
| 4,874,566 | 10/1989 | Heuschkel ..................... 264/323 |
| 5,174,316 | 12/1992 | Keller et al. ................. 134/104.3 |
| 5,225,130 | 7/1993 | Deiringer ....................... 264/37 |

FOREIGN PATENT DOCUMENTS

| | | | |
|---|---|---|---|
| 3603009 | 10/1987 | Germany ......................... 264/37 |
| 52-23179 | 2/1977 | Japan ............................. 264/37 |
| 56-15319 | 2/1981 | Japan ............................. 264/37 |
| 56-101829 | 8/1981 | Japan ............................. 264/37 |
| 57-140122 | 8/1982 | Japan ............................. 264/37 |

OTHER PUBLICATIONS

EREMA "Progress in Plastics Recycling Screen Changer" SW 4170 R.
EREMA, "Progress in Plastics Recycling: Recycling Plants for the Plastics Industry", RGA 160 (E).
EREMA, "Progress in Plastics Recycling: Recycling Plants for the Plastics Industry", RGA 100 (E).
EREMA, "Plant Engineering for Plastics Recycling—EREMA Leads the Field", 1988.
EREMA, "Progress in Plastics Recycling: Pelletizing".
EREMA, "Progress in Plastics Recycling, Screen Changer".

Primary Examiner—Jeffery R. Thurlow
Attorney, Agent, or Firm—Hill, Steadman & Simpson

[57] ABSTRACT

A processing line forms a desired end product for a plastic extrusion machine by supplying raw plastic material to a shredder. The shredder forms partially-fused, irregularly-shaped chunks of the raw plastic. The use of the shredder eliminates the requirement of extraneous matter separation prior to feeding of the shredder. The output of the shredder is conveyed to a ram feeder after passing material separators, such as a magnet and/or a metal detector or the like. The ram feeder forces the chunks to an extruder which ultimately supplies liquified plastic to a pelletizer to form pellets. The pellets are transferred to a storage vat for reuse.

32 Claims, 5 Drawing Sheets

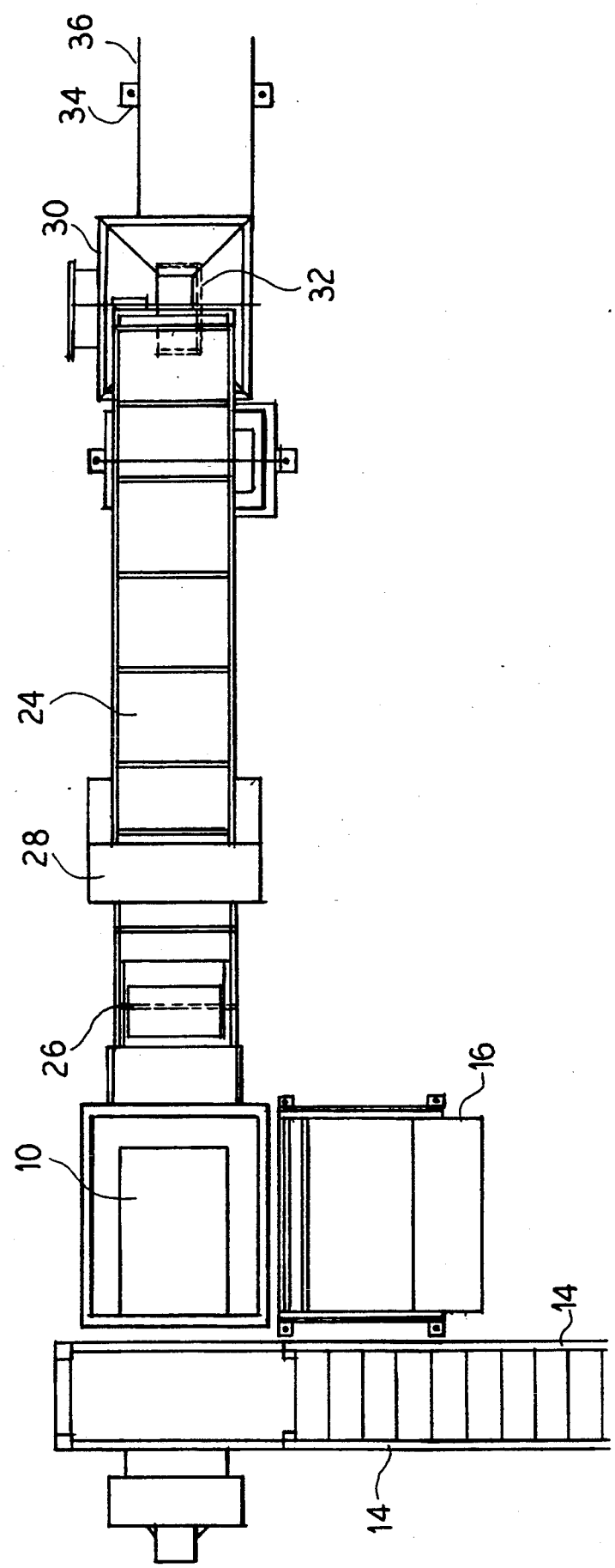

METHOD AND APPARATUS FOR PROCESSING OF RAW PLASTICS FOR REUSE

BACKGROUND OF THE INVENTION

The present invention generally relates to a processing line and method for processing of raw plastics to an end product for reuse of same. More specifically, the present invention relates to shredding of raw plastic for further processing into pellets.

It is, of course, known to recycle plastics into a product for use in normal plastic extrusion machines. It is desirable to do so since plastics are commonly disposed of by both consumers and commercial users resulting in, for example, land fill problems in order to store the disposed plastics. In addition, substantially all raw plastic already used as, for example, a garbage bag may be processed or recycled so that other plastic products may be developed.

Processing lines have, therefore, been developed for recycling of waste plastics or scrap, such as garbage bags, grocery sacks, wrappers from multi-pak candy bars, plastic wrap from beverage containers, and the like. Of course, waste plastics commonly have associated with same, considerable contaminants and extraneous matter, such as metal pieces and the like.

Generally, in current plastic processing lines, the waste plastics are fed to a high speed chopper which chops the plastic raw material into an extremely fine material known in the industry as "fluff." However, before feeding of the plastics into the high speed chopper, considerable attention must be made to the quality of the input. The input must be free from the contaminants and extraneous matter, such as the metal pieces, and the like which can severely damage high speed rotating blades of the chopper.

To this end, separators, such as magnets, must be placed in line before the waste plastics are fed to the chopper to eliminate any extraneous matter which may damage the chopper. In addition, other extraneous matter must be removed by, for example, an operator surveying the input to identify the same entering the chopper. This is both time-consuming and expensive to provide monitoring of the input to the chopper.

However, even more time-consuming and adding additional expense is down-time resulting from extraneous matter entering into the chopper causing damage to the chopper. If damage results, the system must be stopped, and the damage must be identified. Once identified, repair or replacement of the damaged component must take place.

Furthermore, the chopping of raw plastic into the fluff is typically very messy. The fluff when chopped transforms to a dust-like debris. The debris and the fluff itself may be easily blown from the chopper resulting in a dirty work environment. In addition, raw plastic material is wasted which would otherwise be passed through the system for recycling.

In addition, a ram feeder is commonly implemented for supplying materials to an extruder in process lines. However, use of such a ram feeder is not feasible, if not impossible, using the chopped fluff output from the chopper.

A need, therefore, exists for an improved system for processing of raw plastic eliminating the waste produced in other systems as well as reducing or substantially eliminating down-time in the processing line.

SUMMARY OF THE INVENTION

The present invention provides a system and a method for processing of raw plastic into a desired end product for use in normal plastic extrusion machines or the like. The present invention substantially eliminates the waste which occurs in prior systems and substantially eliminates down-time in the line.

To this end, in an embodiment, the present invention provides a method for processing of raw plastic to produce an end product. The method comprises the steps of feeding the raw plastic into a bin, shredding the raw plastic fed from the bin into chunks, separating extraneous matter from the chunks to substantially eliminate the extraneous matter, conveying the chunks to a hopper, providing a ram feeder for forcing the chunks through an extruder having an output of liquified plastic, processing the output of the extruder into the end product, and transferring the end product to a storage hopper.

In an embodiment, the chunks consist of irregularly-shaped, partially-fused portions of the raw plastic.

In an embodiment, the shredding operation occurs at a low speed and a high torque.

In an embodiment, the end product is pellets of plastic.

In an embodiment, the shredding is performed by counter-rotating blades.

In an embodiment, a method is disclosed for providing chunks of raw plastic and for processing of the chunks into pelletized pieces of plastic suitable for manufacture. The method comprises the steps of feeding the raw plastic into a bin, shredding the raw plastic from the bin into the chunks of raw plastic, and separating extraneous matter from the chunks after shredding while advancing the chunks to be processed.

In an embodiment, the feeding of the raw plastic is conveyor driven.

In an embodiment, the feeding of the raw plastic is by gravity.

In an embodiment, the extraneous matter may be ferrous material and/or non-ferrous material and separating thereof is by use of magnets and/or metal detectors.

In an embodiment, a system for processing raw plastic to produce an end product is disclosed. The system comprises a feeder for transferring the raw plastic, means for receiving the raw plastic from the feeder, means for shredding the raw plastic fed from the bin into chunks to form an output, means for conveying chunks of raw plastic and extraneous material from the means for shredding, means for removing matter from the chunks of raw plastic and means for processing the chunks to form a desired end product.

In an embodiment, the means for processing comprises a ram feeder, an extruder and a pelletizer.

In an embodiment, the chunks are liquified and then pelletized to form the end product.

In an embodiment, an apparatus is disclosed for providing fused portions of raw plastic to a feeder of a processor to pelletize the fused portions. The apparatus comprises a feeder for providing an input of substantially raw plastic and miscellaneous extraneous matter. A hopper receives the input from the feeder, and a shredder forms the raw plastic into the fused portions and produces an output. A conveyor transfers the output to be processed wherein means are provided for separating the miscellaneous extraneous matter from the output during transfer.

In an embodiment, the raw plastic is gravity fed into the shredder.

In an embodiment, the means for separating comprises at least one metal detector.

It is, therefore, an advantage of the present invention to provide an improved system and method for processing of raw plastic for reuse.

A further advantage of the present invention is to provide a system and method which substantially eliminates down-time during processing.

A still further advantage of the present invention is to provide a system and method which substantially eliminates waste during processing of raw plastic into an end product for reuse.

Another advantage of the present invention is to provide a system and method for processing of raw plastic into an end product in a clean environment.

Further, an advantage of the present invention is to provide a system and method for processing of raw plastic which only requires shredding of the raw plastic into chunks.

Moreover, an advantage of the present invention is to provide a system and method which eliminates the requirement of removing extraneous matter before shredding.

A further advantage of the present invention is to provide a system and method which may receive any grade plastic as an input to the shredder.

Yet another advantage of the present invention is to provide a system and method for eliminating additional monitoring of the processing line.

Additional features and advantages of the present invention are described in, and will be apparent from, the detailed description of the presently preferred embodiments and from the drawings.

BRIEF DESCRIPTION OF THE DRAWINGS

FIGS. 2A and 2B illustrate a top plan view of the plastic processing line of the present invention.

DETAILED DESCRIPTION OF THE PRESENTLY PREFERRED EMBODIMENTS

Figure 1A:
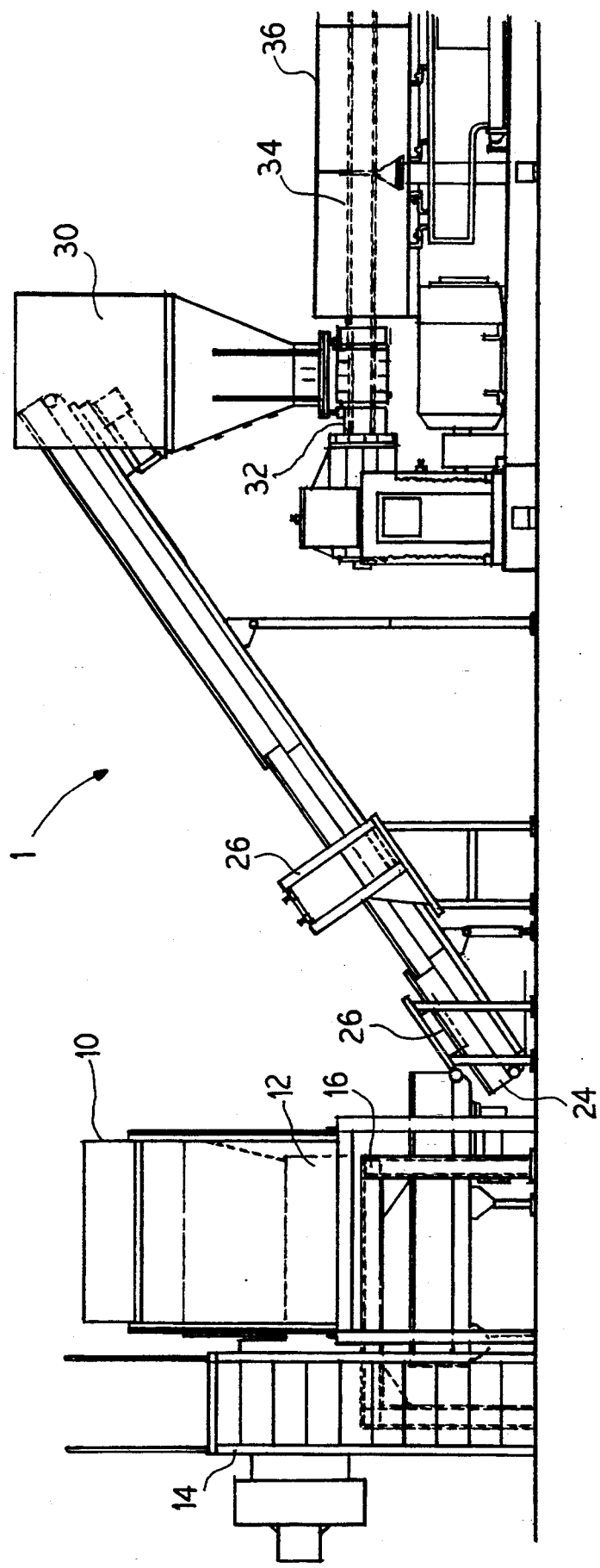
FIGS. 1A and 1B illustrate a perspective view of the plastic processing line of the present invention.
Figure 1B:
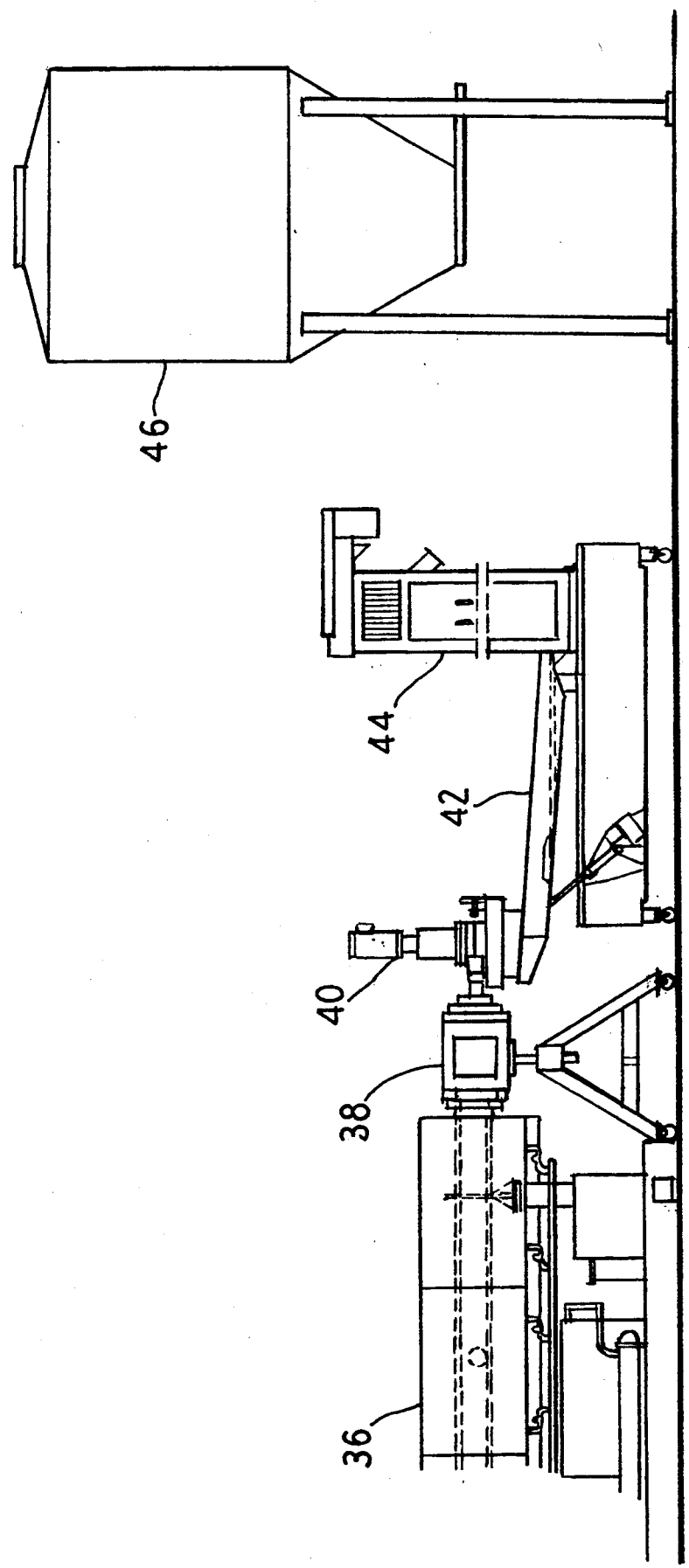
Figure 2B:
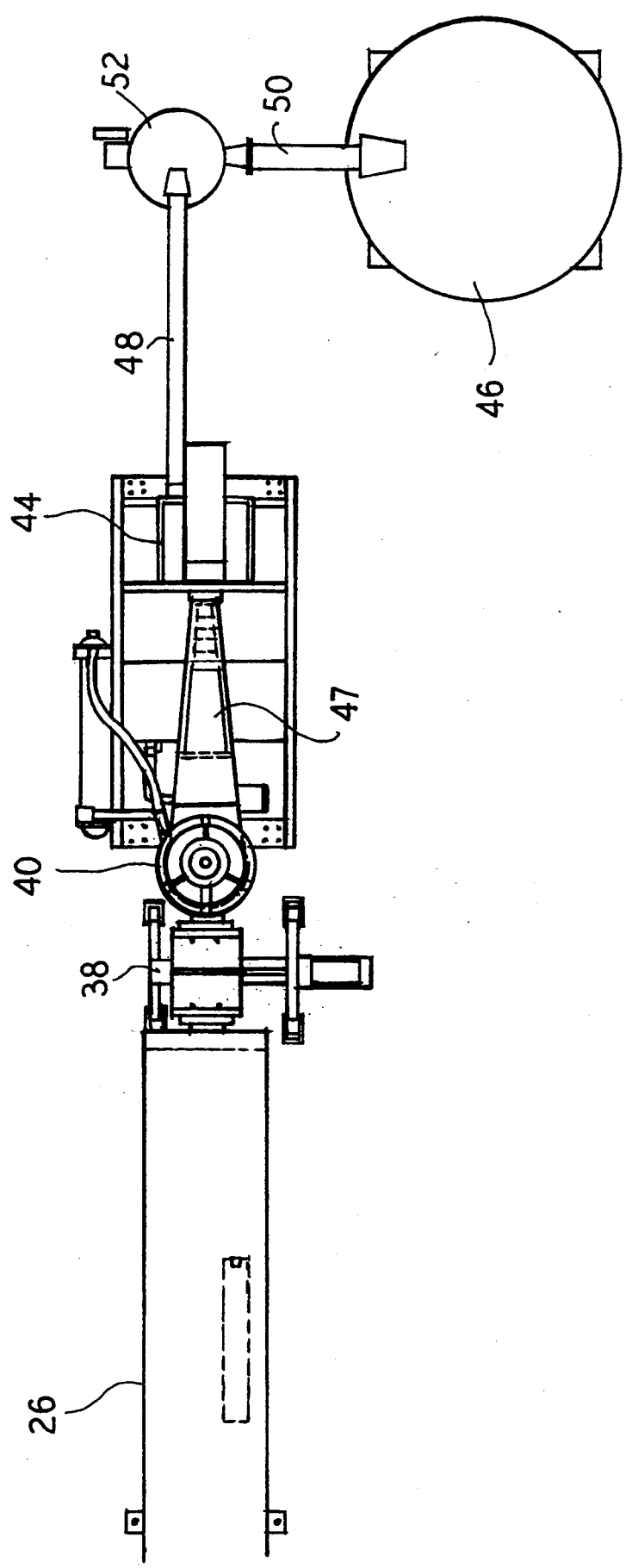
Figure 4:
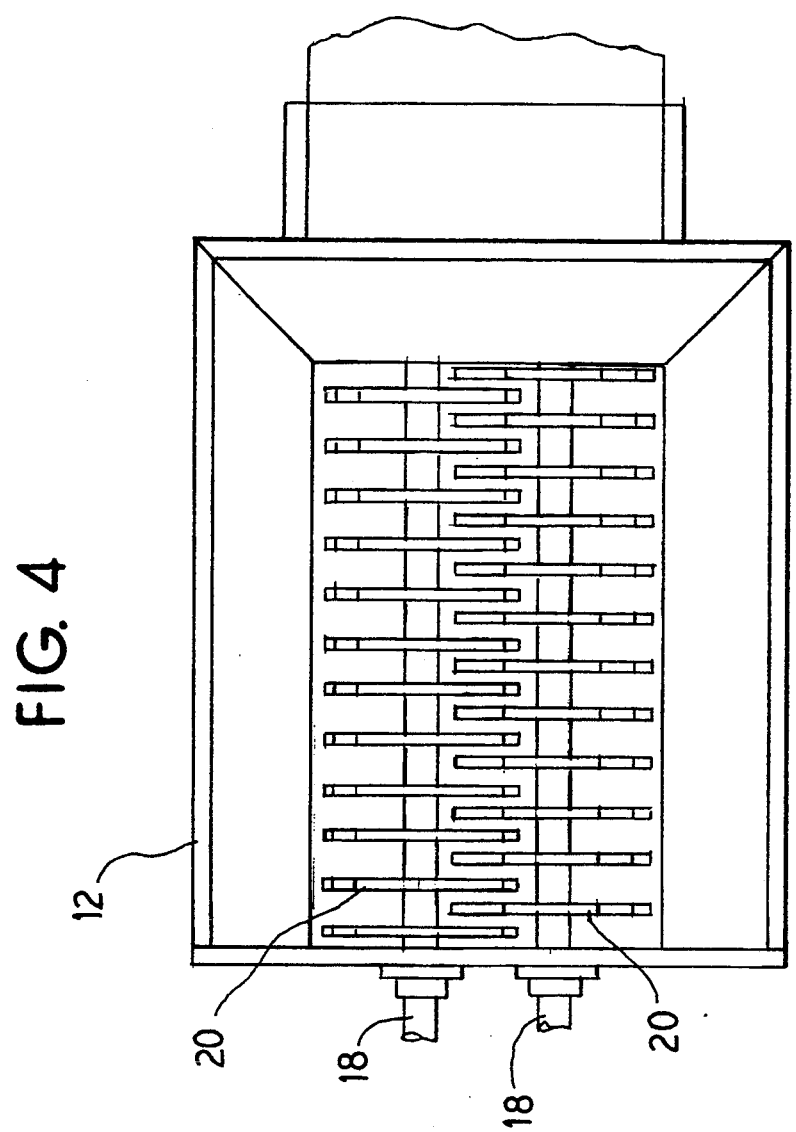
FIG. 4 illustrates a top plan view of an embodiment of the shredder for use in the plastic processing line of the present invention.

The present invention provides a system for processing of input raw plastic into pelletized plastic pieces for use in a normal plastic extrusion machine, for example. More specifically, the present invention discloses a system and method for processing raw plastic without requiring removal of foreign matter prior to shredding of the raw plastic into chunks.

Referring now to FIGS. 1A, 1B, 2A and 2B, wherein like numerals are used to designate like parts, a processing line 1 is generally illustrated. The processing line 1 may typically be used in a plastics recycling-type plant or other industry which requires plastics for packaging for its own use or other specific purposes in which recycling of plastics for reuse may be cost-effective or otherwise desirable.

The processing line 1 includes a material feeder 10, such as a storage hopper. The material feeder 10, in a preferred embodiment, is in the form of a hopper which gravity feeds material therein to a shredder 12. Material, such as raw plastic, may be added to the material feeder 10 by an automatic hydraulic lifter (not shown) which takes standard industrial carts (not shown) and dumps them into the interior of the material feeder 10. The material may then be automatically fed to the shredder 12.

Of course, material may be added manually to the feeder 12. In the alternative, material may be fed by a conveyor or other known manners of feeding the material into the material feeder 10.

In addition, a walkway ladder 14 may be provided adjacent the material feeder 10 for visual inspection of material being fed to the shredder 12. In the alternative, manual feeding of the shredder may occur by an individual ascending to the top of the ladder 14 and feeding material into the feeder 10.

More clearly illustrated in FIG. 2A, a dump stand 16 may be provided which ascends to the top of the feeder 10. The dump stand 16 may be hydraulically, pneumatically or otherwise driven to lift the dump stand for dumping the material into the feeder 10.

Figure 3:
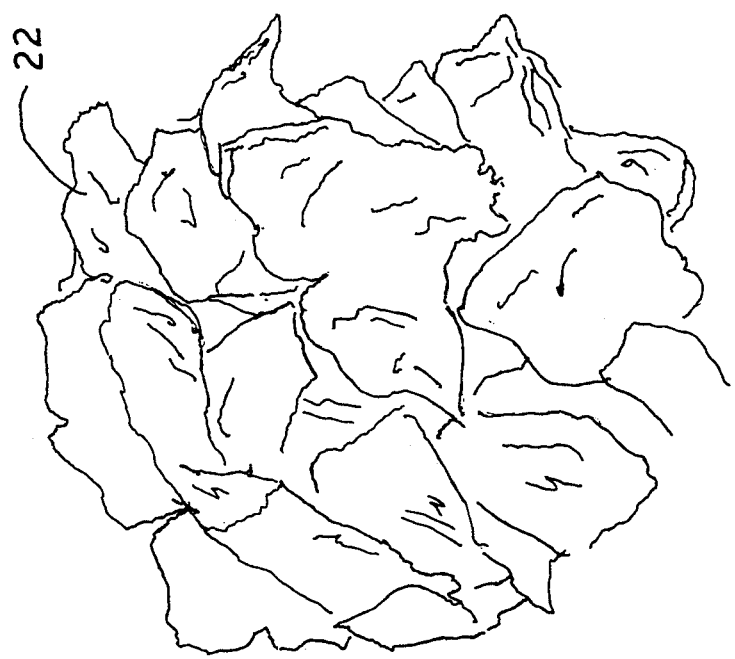
FIG. 3 illustrates a perspective view of the plastic chunks which are output from a shredder of the processing line illustrated in FIGS. 1a, 1b, 2a and 2b for further processing to a desired end product.

In a preferred embodiment, the shredder 12 receives the material from the feeder 10 directly into a pair of counter rotating axes 18 having a plurality of blades 20 within the interior of the shredder 12. The blades 20 are driven about the axes 18 so as to shred the material into so-called "chunks" 22 as illustrated in FIG. 3.

Preferably, the shredder 12 is a large torque machine having relatively slow moving blades 20 counter-rotating about the axes 18 to shred the material into the chunks 22. The shredder 12, during operation, generates heat resulting in the chunks 22 being partially fused together. In a preferred embodiment, the blades 20 are a three-tooth design having one-inch separation between the blades 20.

Using the shredder 12 of the preferred embodiment, the chunks 22 may be on the order of approximately one and one-half inches by approximately three-fourths of an inch. However, all sorts of irregularly-shaped, partially-fused chunks 22 are output from the shredder 12. For example, the chunks 22 may be output from the shredder 12 such that portions of the chunks 22 are actually single layers of the raw plastic attached to multiply fused layers of the raw plastic.

Some of the chunks 22 are output from the shredder 12 virtually unaffected by the blades 20, but partially fused or attached to a portion remote from the unaffected layers of material due to the heat generated in the shredder 12. The fact that the output chunks 22 are desirably partially-fused from the heat generated in the shredder 12 itself allows for any grade of raw plastic to be input to the shredder 12 without concern as to the effect of the generated heat.

Furthermore, in addition to the chunks 22, extraneous matter, such as metal pieces and other waste products, may be incidentally fed through the shredder 12 without prior separation. While it may be desirable to remove any large pieces of metal or other extraneous matter, use of the shredder 12 does not require the same due to the low speed of the rotating blades 20 and their particular configuration within the shredder 12. Therefore, prior to the direct input of the material into the material feeder 10 and further prior to the material reaching the shredder 12, no separating of desired raw material from extraneous matter is required. The output of the shredder 12 is then loaded onto a conveyor 24 by automatic feeding of material, in the form of the chunks 22, being forced through the output onto the conveyor 24.

An indicator (not shown) may be operated at the output of the shredder 12 on the conveyor 24. The indicator operates a control for the shredder 12 to provide a constant output of chunks 22 to be conveyed. The control to the shredder 12 may be in the form of an on/off signal or an RPM variable drive signal to increase or to decrease the output of the shredder 12 and/or to vary the speed of the conveyor 24. Of course, other manners for controlling the output of the chunks 22 from the shredder may be implemented by those skilled in the art.

Along the line of the conveyor 24, a magnet plate 26 may be located between the output of the shredder 12 and the output of the conveyor 24 leading into a second hopper 30. After removing any magnetic pieces with the magnet plate 26 from the chunks 22 which are being transferred on the conveyor 24, a metal detector 28 may be provided for removal of non-ferrous metal not separated by the magnet.

In the event of detection of an unseparated metal, a stop output may be provided to a remote control unit (not shown) to stop the chunks 22 being transferred on the conveyor 24. The unseparated piece or pieces may then be separated prior to further advancing of the chunks 22. Of course, additional magnet plates, such as the magnet plate 26, or other material separating means, such as the metal detector 28, may be implemented as desired such that a substantially pure product consisting of the chunks 22 of shredded infeed material to the shredder 12 is transferred for additional processing.

The second hopper 30 receives the chunks 22 in a substantially pure form and feeds the same to a ram feeder 32. The ram feeder 32 includes a reciprocating rectangular piston having a front curved face generated on an outer diameter curvature of a feed screw. The ram feeder 32 forces the chunks 22 to the screw which acts as an extruder generally illustrated at 34.

Because the material fed into the second hopper 30 is in the form of the chunks 22, gravity feeding, blown feeding or other common feeding mechanisms may not be used effectively with the chunks 22. The ram feeder 32 in combination with the shredder 12 forming the chunks 22 makes implementation of this combination possible.

The extruder 34 allows the chunks 22 from the ram feeder 32 to pass through a normal heating and melting line generally illustrated at 36. The melting line 36 melts and pressurizes the chunks 22 into a liquified state and then decompresses same so as to vent gases from waste products, for example, such as that produced by burning off the contaminants from the raw input. Such contaminants frequently occur, for example, on printing which may be used on the raw plastics that were originally input to t-he processing line 1.

Then, the liquified plastic is repumped and forced through a screen changer 38. The screen changer 38 allows impurities which may still be present in the plastic to be eliminated. The output of the screen changer 38 is then fed into a conventional pelletizer 40 which forms small pellets of plastic which may then be used in plastic material extrusion processes.

The pellets are fed along a pellet transfer device 42 in the form of a water bath cooler conveyor. The transfer device 42 discharges to a dryer 44, such as a spin dryer. The dryer 44 separates the cooling water for recycling to the transfer device 42 and forces the pellets from the pellet transfer device 42 into the transfer lines 48, 50 which subsequently feed into a vat 46. The vat 46 may be fed by one or more of the transfer lines 48, 50 connected to the output of the dryer 44. The processing lines may have an intermediate device, such as a supplemental feeder 52, for assisting in transfer of the pellets through the transfer lines 48, 50 to the vat 46.

The pellets may be dispensed from the vat 46 into a box or other storage devices. The pellets may then be transferred for use in a normal plastic extrusion machine or for other uses, such as re-sale.

It should be understood that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim as our invention:

1. A method for processing of raw plastic to produce an end product, the method comprising the steps of:
   feeding the raw plastic into a bin;
   shredding the raw plastic fed from the bin into chunks wherein the chunks consist of irregularly-shaped, partially-fused portions of layers of the raw plastic;
   separating extraneous matter from the chunks after shredding to substantially eliminate the extraneous matter;
   conveying the chunks to a hopper;
   providing a ram feeder;
   forcing the chunks with the ram feeder through an extruder to provide an output of liquefied plastic;
   processing the output of the extruder into the end product; and
   transferring the end product to a storage hopper.

2. The method of claim 1 wherein the separating removes ferrous and/or non-ferrous materials.

3. The method of claim 1 wherein the shredding occurs at a low speed and a high torque.

4. The method of claim 1 wherein the end product is pellets of plastic.

5. The method of claim 1 wherein the processing is at least partially performed using a pelletizer.

6. The method of claim 1 wherein the raw plastic is gravity fed for shredding.

7. The method of claim 1 wherein the shredding is performed by counter-rotating blades.

8. A method for providing chunks of raw plastic and for processing the chunks into pelletized pieces wherein the chunks consist of irregularly-shaped, partially-fused portions of layers of the raw plastic, the method comprising the steps of:
   feeding the raw plastic into a bin;
   shredding the raw plastic from the bin into the chunks of the raw plastic; and
   separating extraneous matter from the chunks after shredding while advancing the chunks to be processed.

9. The method of claim 8 wherein the feeding of the raw plastic is conveyor driven.

10. The method of claim 8 wherein the separating removes ferrous material and/or non-ferrous material.

11. The method of claim 8 wherein the shredding is performed by counter-rotating blades.

12. A system for processing raw plastic to produce an end product, the system comprising:
a feeder transferring the raw plastic;
means for receiving the raw plastic from the feeder, the means for receiving having a means for shredding the raw plastic fed from the feeder into chunks to form an output of raw plastic and extraneous matter;
means for conveying the chunks of the raw plastic and the extraneous matter output from the means for shredding, the means for conveying having in-line a means for removing the extraneous matter from the chunks of the raw plastic; and
means for processing the chunks to form a desired end product, the means for processing constructed and arranged at an end of the means for conveying.

13. The system of claim 12 wherein the chunks include partially fused, irregularly-shaped portions of the raw plastic.

14. The system of claim 12 wherein the end product is pellets of plastic.

15. The system of claim 12 wherein the means for processing comprises a ram feeder, an extruder and a pelletizer wherein the ram feeder forces the chunks to the extruder which feeds its output to the pelletizer.

16. The system of claim 12 wherein the means for processing liquifies the chunks of raw plastic and pelletizes the liquified plastic to form the end product.

17. The system of claim 12 wherein the means for shredding comprises at least two counter-rotating blades.

18. An apparatus for providing fused portions of raw plastic to a down-line feeder of a processor to pelletize the fused portions comprising:
a feeder providing an input of substantially the raw plastic and miscellaneous extraneous matter;
a hopper receiving the input from the feeder, the hopper having a shredder forming the raw plastic into the fused portions and producing an output;
a conveyor having a first end receiving the output from the shredder and transferring the output to be processed; and
means for separating the miscellaneous extraneous matter from the output during transferring on the conveyor.

19. The apparatus of claim 18 wherein the means for separating comprises a ferrous material remover and/or a non-ferrous material remover.

20. The apparatus of claim 18 wherein the shredder comprises at least a pair of counter-rotating blades.

21. The apparatus of claim 18 wherein the raw plastic is gravity fed into the shredder.

22. The apparatus of claim 18 wherein the means for separating comprises at least one metal detector.

23. The apparatus of claim 18 wherein the feeder comprises a hydraulic lifter of carts containing the raw plastic.

24. A method for processing of raw plastic to produce an end product, the method comprising the steps of:
feeding the raw plastics into a bin;
shredding the raw plastic fed from the bin into chunks wherein the chunks consist of irregularly-shaped, partially-fused portions of the layers of the raw plastic;
conveying the chunks to a hopper;
providing a ram feeder;
forcing the chunks with the ram feeder through an extruder to provide an output;
processing the output of the extruder into the end product; and
transferring the end product to a storage hopper.

25. The method of claim 24 further comprising the step of:
separating extraneous matter from the raw plastic.

26. The method of claim 24 further comprising the step of:
separating extraneous matter from the chunks.

27. A system for processing raw plastic to produce an end product comprising:
a feeder transferring the raw plastic;
means for receiving the raw plastic from the feeder, the means for receiving having a means for shredding the raw plastic fed from the feeder into chunks to form an output;
means for conveying the chunks of the raw plastic from the means for shredding, the meads for conveying having first end receiving the output from the means for shredding; and
means for processing the chunks to form a desired end product wherein the means for processing is constructed and arranged at a second end of the means for conveying.

28. The system of claim 27 further comprising:
means for removing extraneous matter from the chunks of raw plastic wherein the means for removing is constructed and arranged intermediate the first end and the second end of the means for conveying.

29. The system of claim 27 further comprising:
means for removing extraneous matter from the raw plastic wherein the means for removing is constructed and arranged before shredding of the raw plastic.

30. An apparatus for providing fused portions of raw plastic to a down-line feeder of a processor to pelletize the fused portions, the apparatus comprising:
a feeder providing an input of substantially the raw plastic;
a hopper receiving the input from the feeder, the hopper having a shredder forming the raw plastic into the fused portions and producing an output; and
a conveyor transferring the output to be processed, the conveyor having a first end receiving the output from the shredder.

31. The apparatus of claim 30 further comprising:
means for separating miscellaneous extraneous matter from the output during transferring of the output on the conveyor.

32. The apparatus of claim 31 further comprising:
means for separating miscellaneous extraneous matter from the raw plastic prior to shredding of the raw plastic.

* * * * *